United States Patent [19]

Sakamoto et al.

[11] Patent Number: 4,470,087
[45] Date of Patent: Sep. 4, 1984

[54] HEAD BASE DRIVE MECHANISM IN TAPE PLAYER

[75] Inventors: Masayoshi Sakamoto; Minoru Kamata, both of Tokorozawa, Japan

[73] Assignee: Pioneer Electronic Corporation, Tokyo, Japan

[21] Appl. No.: 302,630

[22] Filed: Sep. 15, 1981

[30] Foreign Application Priority Data

Sep. 19, 1980 [JP] Japan .......................... 55-133508[U]

[51] Int. Cl.³ .............................................. G11B 5/54
[52] U.S. Cl. ...................................... 360/105; 360/75
[58] Field of Search ............... 360/105, 75, 96.2–96.4, 360/90; 242/187–210

[56] References Cited

U.S. PATENT DOCUMENTS 4,219,852  8/1980  Magata et al. ................. 360/105 X
4,305,103 12/1981  Osanai ................................ 360/105
4,358,804 11/1982  Uehara ............................. 360/105

*Primary Examiner*—Aristotelis M. Psitos
*Assistant Examiner*—Kim Wong

[57] ABSTRACT

The head base drive mechanism for cassette tape players. The head base which is normally urged toward the stop position is advanced to the play-back position using the rotation of the capstan. A pinion integrally provided on the flywheel of the capstan is engaged or disengaged with a sector gear. The sector gear is blocked from rotation after it goes out of said engagement and before it comes into engagement with the pinion. Since the sector gear is urged in a predetermined direction by way of a cam attached thereto, the release of said blocking causes the sector gear to rotate very quickly while the pinion is in facing relation to the untoothed position of the sector gear. Meantime, the cam actuates the head base to advance it to the play-back position through gear transmission whereas it restores the head base to the stop position quickly with the force by which the sector gear is urged.

6 Claims, 11 Drawing Figures

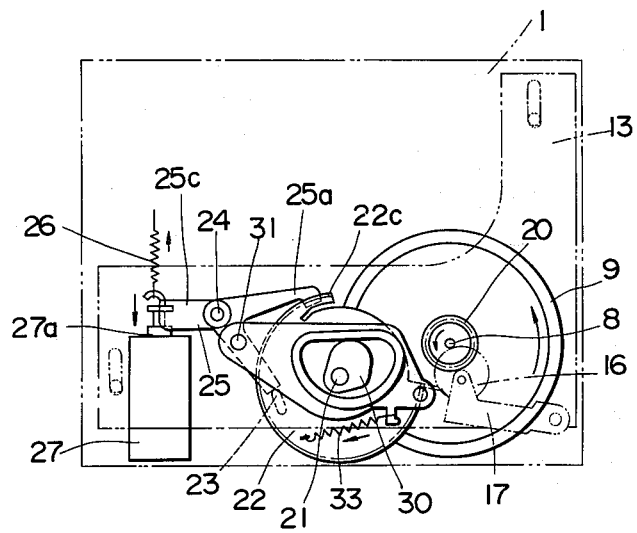
FIG. 6
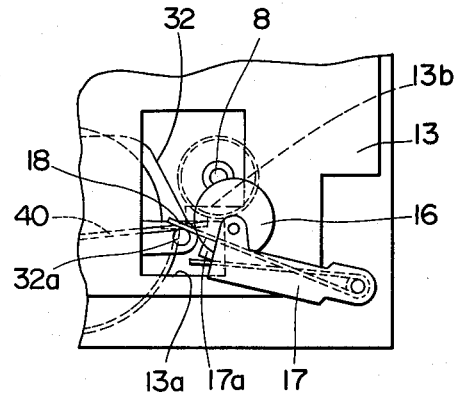
FIG. 9
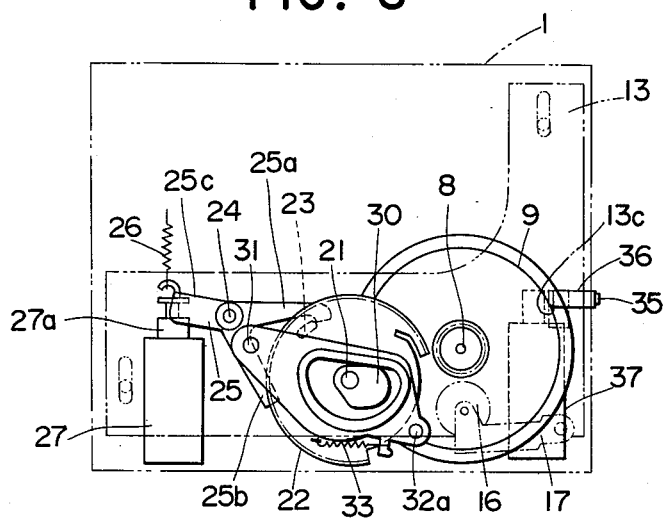
FIG. 8
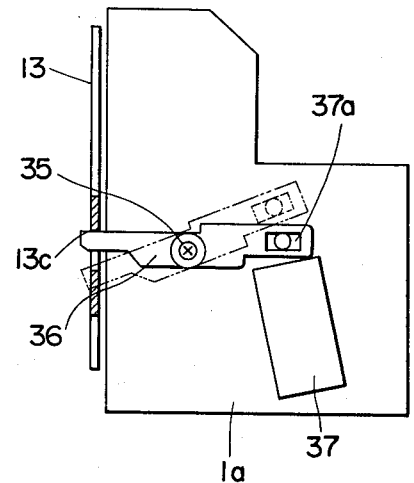
FIG. 10
FIG. 11
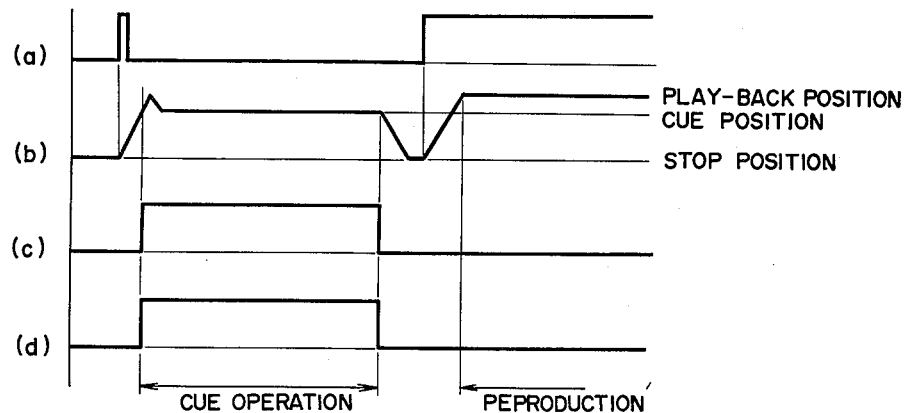

HEAD BASE DRIVE MECHANISM IN TAPE PLAYER

BACKGROUND OF THE INVENTION

The present invention relates in general to a head base drive mechanism for tape players, and more particularly to such a head base drive mechanism in which the rotation of the flywheel which rotates in synchronism with the capstan is utilized to shift the head base from the stop to the play-back positions and maintain there during play.

Tape players incorporating such a head base drive mechanism have already been known in the prior art and are found advantageous in that the supplementary use of a control system such as a feather-touch button system or a remote control switch system can increase efficiency in actuation of the head base between the stop and play-back positions. Another advantage is that, since this head base drive system can eliminate the use of the conventional solenoid for the operation of the head base, consumption of electricity is relatively low in addition to the merit of compactness of design. One example of the head base of this type is the teaching of Japanese Published patent application No. 54-63705 (application No. 52-126941) in which a head drive mechanism for tape players has been disclosed which comprises a chassis for housing components, a capstan rotatively mounted on the chassis, a flywheel concentrically connected to the capstan for rotation therewith a pinion also concentrically connected to and made integral with the flywheel, a sector gear rotatively mounted on the chassis and operatively connected to the pinion for rotation in mesh therewith, a cam made integral with the sector gear for rotation in mesh therewith, an actuating lever pivotally mounted on the chassis and so designed to actuate the head base for sliding movement, a locking member mounted on the chassis and capable of releasably engaging with the sector gear to lock the latter in a locked position while the sector gear whose toothed periphery is interrupted by two untoothed arcs at diametrically opposing portions round its circumference is out of meshing engagement with the pinion with either of the untoothed peripheral portions faced to the working periphery of the pinion, and a solenoid operable to actuate the locking member to engage with the sector gear by energization. Further, this head base drive mechanism is so arranged that, when the sector gear has rotated its toothed peripheral portion out of the pinion with its one untoothed peripheral portion faced to the pinion, the actuating lever acts to shift the head base to the stop position. On the other hand, when the sector gear has its other untoothed peripheral portion opposed to the pinion, the actuating lever permits advance of the head base to the play-back position. Thus, sliding movement of the head base from the play-back to the stop positions is effected by the rotation of the sector gear which is rotated by the pinion, and during which sliding movement the pinch roller has to be swiveled away from the capstan. This displacement of the pinch roller, however, tends to take too much time, allowing, during that prolonged time, the tape to run some extra lengths unintendedly until the pinch roller has reached its home position.

SUMMARY OF THE INVENTION

The head base drive system of this invention overcomes the above mentioned problems. The principal object of the present invention is, therefore, the provision of a tape player in which sliding movement of the head base can be achieved within a reasonably rapid time interval in order to eliminate the unnecessary overrunning of the tape as has been found in some of the prior art head base drive systems.

Another object of the present invention is the provision of a tape player in which a cue operation without incorporating an additional solenoid of large size is performed.

BRIEF DESCRIPTION OF THE DRAWINGS

A preferred embodiment of the head base drive mechanism for tape players will be described in conjunction with the accompanying drawings, in which:

FIGS. 4 through 8 are plan views of the head base drive mechanism of FIG. 3 in the various phases of operation;

FIG. 9 is an enlarged partial view of the head base drive mechanism of FIG. 6;

FIG. 10 is a side view of the head base drive mechanism with the irrelevant components removed for the sake of clarity; and FIG. 11 is a timing chart comprising the curves (a) through (d) representing the behavior patterns the principal components are supposed to take when the tape player is operated in the cue position.

DETAILED DESCRIPTION OF THE EMBODIMENTS

Figure 1:
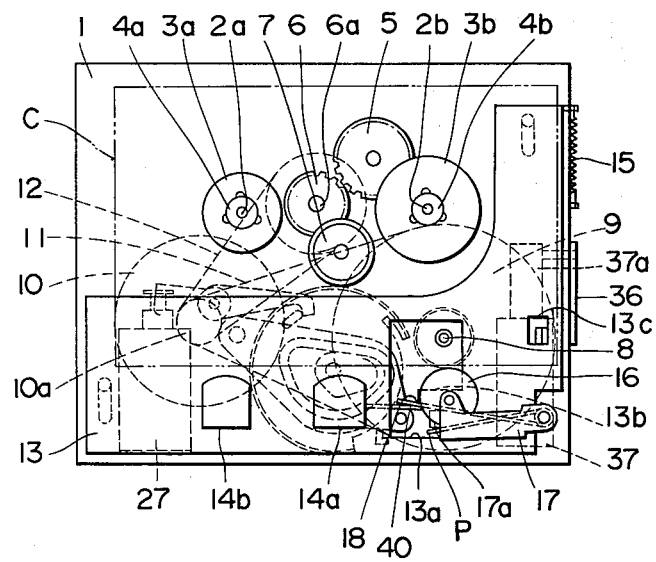
FIG. 1 is a plan view of the tape player incorporating the head base drive mechanism of the invention.

Referring first to FIG. 1, there is schematically illustrated a tape player head base drive mechanism of this invention, in which the numeral 1 indicates generally a chassis. A pair of suitably spaced pins 2a and 2b, respectively, are fixed to the chassis 1. The paired spaced pins 2a and 2b each carry a reel shaft 4a and 4b, respectively, which is rotatably disposed for rotation about its respective pin. The paired reel shafts 4a and 4b are so designed to receive and engage the corresponding reel hub holes of a cassette C to be loaded in the tape player to drive the tape of the cassette, and are operatively connected to a pair of reel turntables 3a and 3b, respectively. The reel turntables 3a and 3b are made integral with the respective reel shafts for rotation therewith. In this particular embodiment, the one reel turntable 3a in the left is intended for driving the supply reel of the cassette while the other 3b in the right of the drawing for operating the take-up reel.

Mounted on the chassis between the supply and take-up reel turntables 3a and 3b is a first idle gear 5 which is in constant mesh with a first gear wheel (not shown) that is concentrically connected to and made integral with the take-up reel turntable 3b for rotation in synchronism. The supply reel turntable 3a is also connected to a second gear wheel (not shown) that is concentrically made integral therewith for rotation in synchronism. A second idle gear 6 is provided which is so designed to be able to displace relative to its neutral position for selective meshing engagement with either the second gear wheel connected to the supply reel turntable or the first idle gear 5, but which is normally not engaged with either. Further, an idle wheel 7 is provided mounted on the chassis and is designed to be able to displace with respect to its neutral position to concurrently engage with the periphery of the take-up reel turntable 3b and a small diameter shaft 6a on which the second idle gear 6 is carried for synchronous rotation with the shaft.

A capstan, designated by the numeral 8, is rotatably journalled in the chassis 1. The capstan 8 has its lowermost end extended vertically downwardly through the chassis 1 and affixed to the center of a flywheel 9 that is situated beneath the chassis. An electric motor, generally designated at 10, is mounted on the chassis 1 and is operatively connected to a drive pulley 10a for rotation. A first drive belt 11 is passed round the drive pulley and the flywheel 9 to transmit the rotational power of the motor 10 to the capstan 8 through the flywheel. A second drive belt 12 is provided which is passed round the second idle gear 6 and the drive pulley 10a, so that the motor 10 can also rotate the idle gear 6 through the drive pulley.

A head base 13 is slidably disposed on the chassis 1 to slide back and forth with respect to the chassis in the direction indicated by the double headed arrow AB in the drawing. The head base 13 is provided with a recording/reproducing head 14a and an erasing head 14b, both of the conventional type. Further, the head base 13 is provided with a suitable guide means (not shown) which guides the sliding movement of the head base in the direction pointed by the double head arrow AB in the drawing over a predetermined range of distance limited by a front and a rear stopper (not shown) that are situated on the chassis at such suitable places, respectively, as to mechanically prevent excess sliding of the head base when the latter is being shifted between the stop position and the play-back position or between one of these positions and any other intermediate operational position. A tension spring 15 is connected between the chassis and the head base to normally urge the head base towards the stop position: whereby, at an operator's command to put the head base into the stop position by actuating a suitable switch, the head base will by the action of the tension spring retract by itself and automatically return to the stop position depicted in FIG. 1.

Figure 2:
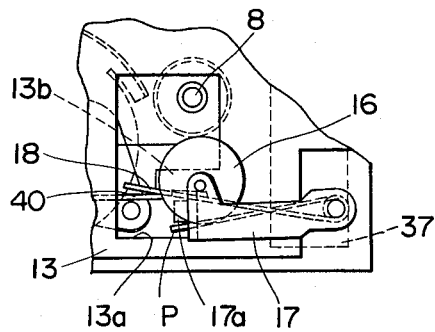
FIG. 2 is an enlarged partial plan view of the head base drive mechanism of FIG. 1.

A pinch roller 16 is rotatively disposed on one end of a pinch roller holder 17 which, at its other end, is pivotally mounted on the chassis 1 for swivelling motion, such that the pinch roller can be brought into contact with the capstan 8. The pinch roller holder 17 is provided with a bent member 17a which, as more clearly be seen in FIG. 2, extends between the rear edge of an opening 13a formed in the head base 13 and a projection 13b that protrudes upward from the opening 13a, with a certain amount of spacing P maintained between itself and the rear edge of the opening. The pinch roller holder 17 is also provided with a first resilient member 18 with a sufficient resiliency to insure that the pinch roller 16 be properly pressed against the capstan 8 when they are engaged for operation.

Figure 3:
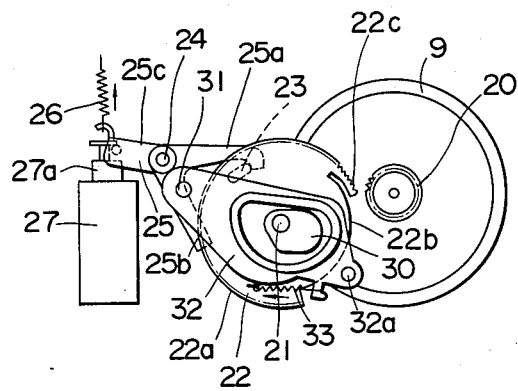
FIG. 3 is an enlarged partial view with the removal of certain components of the head base drive mechanism of FIG. 1.

As shown in FIG. 3, which presents the head base mechanism of FIG. 1 in its enlarged view, but with the removal of the chassis 1 and the head base 13 for the purposes of clarity of illustration, a pinion 20 is concentrically connected to the flywheel 9 which is made integral therewith for synchronous rotation. Mounted to the underside of the chassis 1 and extending downwardly therefrom is a sector gear pin 21 on which a sector gear 22 is rotatably carried. The sector gear 22 is provided partially round its circumference with a toothed peripheral portion 22a for mesh engagement with the pinion 20 for rotation only when the sector gear 22 has brought its toothed peripheral portion into mesh with the pinion. The sector gear 22 includes an untoothed peripheral portion 22b which, in this particular embodiment, preferably occupies a continous arc of approximately 90 degrees. A peninsular peripheral portion 22c connects one end of the toothed peripheral portion 22a with the adjacent end of the untoothed peripheral portion 22b and is so designed to permit smooth entry of the rotating pinion 20 from untoothed to toothed zone on the sector gear. A locking projection 23 is provided on that side of the sector gear 22 which does not face the underside of the chassis 1 and is intended for locking purposes as will be explained later.

On the underside of the chassis 1 is also mounted a pin 24 on which a locking arm assembly 25 is pivotally mounted for oscillation about the pin 24. The locking arm assembly 25 comprises first and second locking elements 25a and 25b, respectively, that branch off in different directions at the pin and a control arm 25c that extends in a direction largely opposite to those in which the locking elements 25a and 25b are oriented. The control arm 25c is connected to one end of a tension spring 26 whose other end is affixed to the chassis 1. The tension spring normally urges the locking arm assembly 25 in a clockwise direction and serves to maintain the latter in the position depicted in FIG. 3 which position will hereinafter be called the first locking position for the sake of convenience of description. Also, a first solenoid 27 is provided and is operatively connected to the locking arm 25. The first solenoid includes a reciprocable iron member 27a which is axially movably inserted within the first solenoid. The upper end of the iron member is affixed to the control arm 25c of the locking arm assembly. When the first solenoid 27 is not engaged or in what will be called hereinafter the first non-energized state, the iron member is not magnetically activated permitting the locking arm assembly which is normally urged by the tension spring 26 in a clockwise direction to take a first locking position. When the first solenoid is energized, or in what will be called hereinafter the second energized state, the iron member is pulled within the solenoid causing the locking arm assembly to rotate in a counter-clockwise direction and then maintain it in what will hereinafter be called a second locking position. Again, when the first solenoid 27 is not energized, the locking arm assembly is in the first locking position, with the locking element 25a of the locking arm assembly 25 engaged with the locking projection 23 of the sector gear 22. On the other hand, the energization of the first solenoid 27 causes the locking arm assembly 25 to rotate into the second locking position where the locking element 25b will be engaged with the locking projection 23 of the locking arm assembly 22. The arrangement is such that, in either of the first and second locking positions of the locking arm assembly in engagement with the locking projection 23, the pinion 20 is not in mesh with the toothed peripheral position 22a of the sector gear 22, since the pinion gear 20 is faced to the untoothed peripheral portion 22b. In more detail, the angle swept by the sector gear 22 between the second angular position where the locking element 25b is locking the locking projection 23 and the first angular position where the locking element 25a of the locking arm assembly 25 is engaged with the locking projection 23 is an arc of approximately 80 degrees that is set smaller than the approximate 90 degrees arc of the untoothed peripheral portion 22b of the sector gear 22. Because of this relatively smaller arc of rotation of the sector gear 22 between the aforesaid two angular positions, the pinion 20 is always faced to the untoothed peripheral portion 22b as long as the sector gear is at either of these angular positions and more particularly between the second angular position after the toothed portion goes out of the meshing engagement with the pinion and the first angular position before the toothed portion comes again into said meshing engagement.

A cam 30 is mounted off center on and made integral with that surface of the sector gear 22 which faces the underside of the chassis 1. Further, on the underside of the chassis 1 is affixed a shaft 31 on which one end of an actuating lever 32 is pivotally mounted. Said actuating lever 32 has an opening therein, the inner periphery of which acts as a cam follower. A tension spring 33 which connects the actuating lever 32 and the chassis 1 acts to force the actuating lever 32 into pressure contact with the periphery of the cam 30 at one point. An actuating pin 32a is provided on the other end of the actuating lever 32 and extends upwardly into the opening 13a of the head base 13 through a slot (not shown) formed in the chassis 1. When the sector gear 22 is in the first angular position, the actuating lever is contacting with the cam 30 at a lower circumferential point, i.e., the point on the cam periphery nearer to the center of the sector gear. Thus, when the sector gear is rotated thereby rotating the cam 30, the point of contact on the cam circumference by the actuating lever 32 will also move into a higher point, i.e., the point farther from the sector gear center, thereby rotating the actuating lever 32 which in turn causes the actuating pin 32a to move. As the sector gear further rotates, the actuating pin 32a will be forced into abutment against the first resilient member 18 connected to the pinch roller holder 17 so as to push the head base 13 from the stop position to the play-back position.

Referring now to FIG. 10, which is a side view of the tape player of the present invention, one end plate 1a of the chassis 1 is shown to have a fixed pin 35 mounted thereon on which fixed pin a stopper lever 36 is pivotally carried for rotation about the fixed pin parallel to the head base. One end of the stopper lever 36 is engaged with an elongated slot 13c formed in the head base 13, with its other end affixed to a movable iron core 37a which is reciprocably inserted within a second solenoid 37 also mounted on the end plate 1a of the chassis. It is to be noted, however, that, although the second solenoid 37 is intended to actuate the stopper lever by energization, its stopper lever actuating capacity should be selected at such a rate, as sufficient to be able to prevent the head base 13 from retracting to the stop position through the stopper lever 36, when the head base strives to move back from the play-back position, but not sufficient to shift the head base 13 against the action of the tension spring 15. When the second solenoid is not energized, the stopper lever 36 is left to rotate, following the sliding movement of the head base 13 out of engagement with the elongated slot.

The numeral 40 indicates a second resilient member, such as an elastic line, which extends across the slot 13a of the head base 13. After the pinch roller 16 has been pressed against the capstan 8, this second resilient member will be actuated urged by the swivelling actuating pin 32a to independently push on the head base 13.

The operation of the head base drive mechanism will hereinafter be described in detail.

First, the procedure for actuating the tape player from the stop position depicted in FIG. 1 or 3 to the play-back position will be described. Now it is assumed that a cassette C has been set in position on the supply and take-up reel turntables 3a and 3b and the motor 10 already energized.

When the head base 13 is in the position depicted in FIGS. 1 and 3, the force of the tension spring 26 serves to maintain the locking element 25a of the locking arm assembly 25 to be engaged with the locking projection 23 of the sector gear 22, with its untoothed peripheral portion 22b opposed in the direction of the pinion 20 connected to the flywheel 9. Also, the actuating lever 32 is in contact with the cam 30 at a point a little beyond the lowest circumference point on the cam periphery, as can best be seen in FIG. 3, so that the sector gear 22 with the cam 30 thereon is urged to rotate in the arrowed direction (in FIG. 3).

Figure 4:
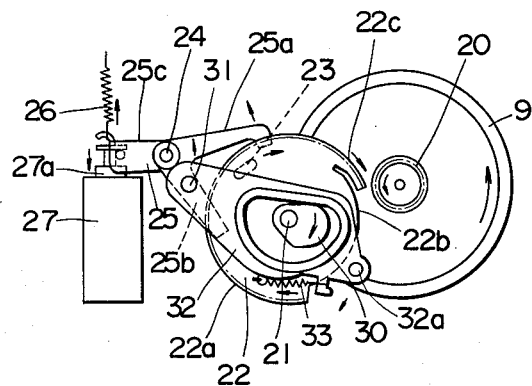

Now, when the tape player in the aforesaid position is switched on for reproduction by means of the appropriate control button (not shown), the first solenoid 27 will be energized to shift from its current first non-energized state to the second energized state to thereby bring the locking arm assembly 25 to rotate in a counter-clockwise direction (FIG. 4) against the force of the tension spring 26 from the first locking position depicted in FIG. 3 to the second locking position. This counter-clockwise rotation of the locking arm assembly 25 causes its locking element 25a to go out of engagement with the locking projection 23, thereby releasing the sector gear 22 from the first angular position. At this moment, the actuating lever 32 that has, in the stop position of the head base, been in contact with the cam 30 at a point a little beyond the lowest circumferential point acts to rotate the sector gear 22 in a clockwise direction or the direction indicated by the arrow in FIG. 4, until the sector gear 22 has rotated its untoothed peripheral portion 22b away from in front of the pinion 20. Thus, in this manner, the engagement of the pinion 20 with the toothed peripheral portion 22a of the sector gear is achieved. As a result, the rotation of the pinion 20 will be transmitted to the sector 22 and hence the cam 30. The resulting rotation of the cam 30 in a clockwise direction brings the actuating lever 32 to rotate also in a clockwise direction about its pin 31 until the actuating pin 32a on the actuating lever abuts against the first resilient member 18 on the pinch roller holder 17 so as to oscillate the pinch roller holder 17 in a clockwise direction. Further movement of the actuating pin causes the bent member 17a of the pinch roller holder 17 to thrust against the projection 13b on the head base 13 thereby pushing on the head base 13 in the direction indicated by the arrow head B in the drawing against the force of the tension spring 15. After the pinch roller 16 has been pressed on the capstan 8, the actuating pin 32a still continue to move a little predetermined distance until the first resilient member 18 is elastically bent by the actuating pin 32a to press the second resilient member 40 on the head base 13. Thus, after the pinch roller holder 17 has completed its full swivelling motion, the head base 13 still has a little distance to travel in the direction indicated by the arrow head B in the drawing.

Figure 5:
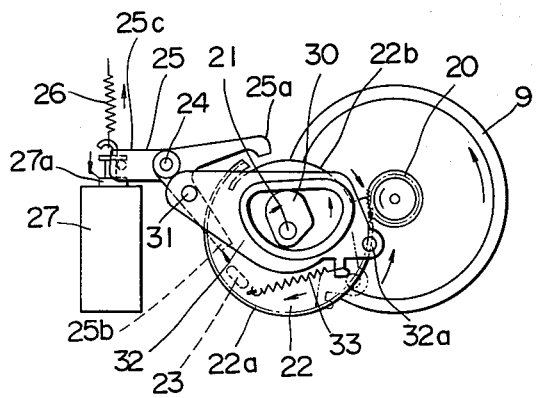

At the point just before the sector gear 22 is about to rotate its toothed peripheral portion 22a out of meshing engagement of the pinion 20, the actuating lever comes into contact with the highest circumferential point of the cam 30, as can best be seen in FIG. 5. This is also the point where the head base 13 is set to reach its most advanced position from which it must not advance any farther. At the very moment when the toothed peripheral portion 22a of the sector gear 22 has only moved out of the pinion 20, the actuating lever 32 is still in contact with the cam 30 at a point a little beyond the highest circumferential point, and thereafter the actuating lever 32 acts to rotate the sector gear through the cam 30 in such a direction as to further turn the toothed peripheral portion of the sector gear 22 completely out of engagement of the pinion 20.

When the sector gear 22 has gone out of intermeshing engagement with the pinion 20, in the way mentioned above, the locking element 25b will engage the locking projection 23 to hold the sector gear 22 and hence the cam 30 in the second angular position (in FIG. 6), if the first solenoid 27 was then in the second energized state with the locking arm assembly 25 maintained in the second locking position. If this condition has been met, then pinch roller 16 can be tightly pressed against the capstan 8, while the head base 13 be maintained in the play-back position.

Thus, when the head base 13 is in the play-back position, the idle wheel 7 that has been displaced from its neutral position following the sliding movement of the head base 13 is in engagement with both of the small diameter shaft 6a of the second idle gear 6 and the outer periphery of the take-up reel turntable 3b. In this manner, the rotation of the second idle gear 6 transmitted from the motor 10 by means of the first drive belt 11 can be transmitted to the take-up reel turntable 3b through the small diameter shaft 6a made integral with the second idle gear 6 and the idle wheel 7.

Figure 7:
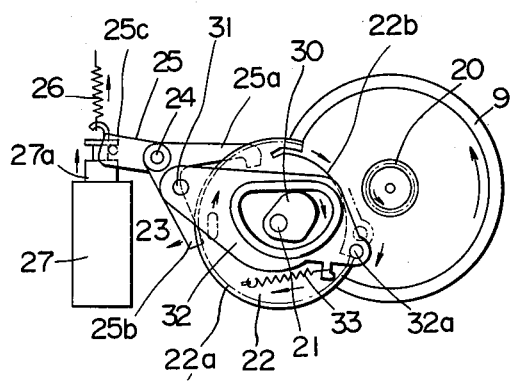

The procedure for shifting the head base 13 from the play-back position to the stop position will now be described in accordance with the present invention. This is initiated by de-energizing the first solenoid 27 to switch it from the second energized state depicted in FIG. 6 to the first non-energized state which releases from magnetic attraction the locking arm assembly 25 which, then, will by the action of the tension spring 26 rotate in a clockwise direction from the second locking position depicted in FIG. 6 into the first locking position. This oscillation of the locking arm assembly also accompanies the disengagement of the locking element 25a from the locking projection 23, thereby releasing the sector gear 22 from locking in the second angular position which in turn permits the actuating lever 32 to force the cam 30 and hence the sector gear 22 to swing into the first angular position depicted in FIG. 7. As soon as the sector gear has reached the first angular position, it will again be locked by the locking arm assembly 25 that has already been rotated into the original first locking position depicted in FIG. 3. At this point, the actuating lever 32 comes into contact with the cam 30 that has also rotated into the first angular position, pressing on the cam 30 at a point a little beyond the lowest circumferential point, with its actuating pin 32a retracted to its original position. This retraction of the actuating pin also removes the force exerted on the head base 13 through the first resilient member 18 and the pinch roller holder 17, permitting the tension spring 15 to force the head base 13 to return to the stop position and the pinch roller holder 17 to swing back to its original position.

The operation for switching the tape play to the cue position where the tape of a cassette loaded can be detected to locate not-recorded portions on the tape track will be described in accordance with the present invention.

When it is necessary to shift the tape player into the cue position, the first solenoid 27 has to be energized to shift from the first non-energized to the second energized state, just as in the case of turning on the tape player for play-back. The important difference is that the energization time for the first solenoid 27 to remain in the second energized state is extremely short, that is, the first solenoid 27 is required to be de-energized quickly after energization to return from the second energized state to the first de-energized state before the head base 13 can have a sufficient time to reach the play position that is normally obtained, as have already been explained in detail, by the sector gear 22 having rotated into its second angular position following the disengagement of the sector gear 22 from the locking member 25 in the first angular position. This quick time interval of energization and subsequent de-energization of the first solenoid permits the head base 13 to be suspended at a predetermined intermediate position, or the cue position, advanced from the stop position but yet a little short of distance to the play-back position, and when the head base is at this cue position, the second solenoid 37 has to be energized to activate the stopper lever 36 to lock the head base in this position. Since the head base has not moved to the play-back position, the sector gear 22 must return back to the first angular position from a point before the second angular position where it can be locked. Similarly, the actuating lever 32 and the pinch roller 16 are allowed to return to its initial position. Only, the head base 13 is maintained by the stopper lever 36 in the cue position depicted in FIG. 8 with the recording/reproducing head 14a and the erasing head 14b maintained in slight contact with the tape face of a loaded cassette and the pinch roller 16 moved away from the capstan 8, so that the operator can perform necessary detection on the tape for not-recorded portions. When the tape player is to be played again, after detection, the second solenoid 37 has to be de-energized to permit the head base 13 to return to the stop position by the force of the tension spring 15. Thereafter, following the steps described above, the tape player can be turned on for reproduction. FIG. 11 is a timing chart comprising the four line (a) through (d) representing the typical behaviour patterns that the first solenoid 27, the head base 13, the second solenoid 37, and the stopper lever 36, respectively, are supposed to take between the cue and play-back position.

Fast forwarding and rewinding of the tape can be effected, with the tape player maintained in the position depicted in FIG. 1, by displacing the second idle gear 6 relative to its neutral position by means of a suitable drive mechanism into meshing engagement either with the gear wheel 5 or with a pinion (not shown) operatively connected with the supply reel turntable 3a.

It will be appreciated from the above description that the tape player of this invention can achieve efficient drive of the tape; the automatic returning action of the head base from the play-back position to the stop position serves to permit the pinch roller to return quickly, thereby eliminating the unintended overrunning of the tape.

Further, the tape player of the present invention has a unique head base drive mechanism in which, when the head base is allowed to automatically move from the play-back position to the stop position, it can be stopped at a position for cue operation of the head base mechanism by means of a stopper which is activated by the energization of a solenoid, which solenoid, since it is not used for the shift of the head base, may be of small size and small capacity, sufficient to hold at the cue position the head base in its automatically returning from the play-back to the stop position. Therefore, the tape player of the present invention is small in size, simple in design, compact in structure, and inexpensive in manufacture.

What is claimed is:

1. A head base drive mechanism in a tape player comprising a chassis;

a head base carrying a head thereon and slidably disposed on said chassis between a playback position and a stop position;

a tension spring connecting the chassis and the head base to normally urge the head base toward said stop position;

a rotating capstan journalled in the chassis and having a pinion concentrically connected thereto;

pinch roller means provided opposite said rotating capstan and in contact engagement with said head base;

a sector gear rotatably mounted to the chassis and having a toothed section and an untoothed section, said toothed section being adapted to be in meshing engagement with said pinion;

a cam plate attached to said sector gear;

an actuating lever for actuating said head base pivotally mounted to the chassis, said actuating lever being in contact with said cam plate and being biased in a predetermined direction;

means for alternately locking said sector gear, said means being adapted to take a first position for locking the sector gear at a first lock position where said pinion is opposite a first end of the untoothed section and to take a second position for locking the sector gear at a second lock position where said pinion is opposite a second end of the untoothed section, said cam plate being adapted to drive the actuating lever to actuate the head base toward the playback position against the bias of said tension spring when the sector gear takes said second lock position while pressing said pinch roller means against the rotating capstan and to release the head base from said playback position when the sector gear takes said first lock position said biasing of the actuating lever acting on the cam plate to bring the pinion into engagement with the toothed section of said sector gear upon release of the locked sector gear from the first lock position and to allow the sector gear which has gone out of engagement with the pinion to rotate upon release from the second lock position to take the first lock position, whereby the actuating lever is allowed to rotate in said predetermined direction such that said pinch roller is released from said pressing against the rotating capstan to allow the head base to retract from the playback position to the stop position by said tension spring, said locking means being adapted to shift from the first position to the second position but return to said first position immediately thereafter to permit the sector gear to take the first lock position, whereby the actuating lever is allowed to rotate in said predetermined direction such that said pinch roller is released from said pressing against the rotating capstan and the head base is released to move from the playback position toward the stop position; and stop means for stopping, during said movement from the playback position to said stop position the head base at a cue position where said head base is slightly retracted from the playback position while maintaining tape contact of the head.

2. A head base drive mechanism according to claim 1, wherein said cam plate is integrally mounted off center on one surface of the sector gear.

3. A head base drive mechanism according to claim 2, wherein an opening is provided in the actuating lever, said opening having an inner periphery which follows said cam plate.

4. A head base drive mechanism according to claim 1, wherein said forcing of the head base to the playback position is performed by way of the actuating lever and the pinch roller means.

5. A head base drive mechanism according to claim 1, wherein said pinch roller means includes a pinch roller holder pivotally mounted to the chassis, and a pinch roller attached to said pinch roller holder.

6. A head base drive mechanism according to claim 1, wherein said cam plate contacts the actuating lever immediately before a circumferential lowest point thereof when at said first position and immediately after a circumferential highest point thereof when at said second position.

* * * * *